United States Patent
Graf

(10) Patent No.: US 9,633,756 B2
(45) Date of Patent: Apr. 25, 2017

(54) DEVICE FOR CONNECTING A CIRCUIT BREAKER

(71) Applicant: ABB AG, Mannheim (DE)

(72) Inventor: Ralf Graf, Mannheim (DE)

(73) Assignee: ABB AG, Mannheim (DE)

( * ) Notice: Subject to any disclaimer, the term of this patent is extended or adjusted under 35 U.S.C. 154(b) by 518 days.

(21) Appl. No.: 13/890,881

(22) Filed: May 9, 2013

(65) Prior Publication Data

US 2013/0240238 A1    Sep. 19, 2013

Related U.S. Application Data

(63) Continuation of application No. PCT/EP2011/005564, filed on Nov. 4, 2011.

(30) Foreign Application Priority Data

Nov. 9, 2010   (DE) .................. 10 2010 050 654

(51) Int. Cl.
| | | |
|---|---|---|
| *H01B 7/00* | (2006.01) | |
| *H02B 1/20* | (2006.01) | |
| *H02G 5/00* | (2006.01) | |

(52) U.S. Cl.
CPC ............ *H01B 7/0009* (2013.01); *H02B 1/20* (2013.01); *H02G 5/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,466,889 A | * | 11/1995 | Faulkner ................ | H02G 5/007 174/133 B |
| 2003/0067756 A1 | * | 4/2003 | Popa ..................... | H02G 5/005 361/775 |
| 2003/0196828 A1 | * | 10/2003 | Schilson ............. | B23K 20/106 174/117 F |

(Continued)

FOREIGN PATENT DOCUMENTS

| | | |
|---|---|---|
| CH | 443 448 A | 9/1967 |
| DE | 11 30 034 B | 5/1962 |
| DE | 71 02 682 U | 5/1971 |

(Continued)

OTHER PUBLICATIONS

International Search Report (PCT/ISA/210) issued on Dec. 2, 2011, by the European Patent Office as the International Searching Authority for International Application No. PCT/EP2011/005564.

(Continued)

*Primary Examiner* — Timothy Thompson
*Assistant Examiner* — Krystal Robinson
(74) *Attorney, Agent, or Firm* — Taft Stettinius & Hollister LLP

(57) ABSTRACT

An arrangement for connecting a circuit breaker in a circuit, for example, in a switchgear, having conductors designed in the form of busbars and supported against each other for receiving forces resulting from normal operating behavior and from short circuit situations. The conductors are disposed in at least two-part claddings each completely peripherally enclosing the respective conductor and serving as electrical insulation.

11 Claims, 2 Drawing Sheets

(56) References Cited

U.S. PATENT DOCUMENTS

2004/0118589 A1* 6/2004 Pierrot .................... H02G 5/06
                                                    174/68.2
2010/0319958 A1* 12/2010 Latimer ................ H02G 5/005
                                                    174/110 D

FOREIGN PATENT DOCUMENTS

| DE | 89 03 177 U1   | 5/1989  |
| DE | 195 02 048 A1  | 7/1996  |
| DE | 102 14 203 A1  | 10/2003 |
| DE | 203 15 711 U1  | 12/2003 |
| EP | 1 193 822 A2   | 4/2002  |
| EP | 2 110 914 A2   | 10/2009 |
| FR | 2 295 595 A1   | 7/1976  |

OTHER PUBLICATIONS

Written Opinion (PCT/ISA/237) issued on Dec. 2, 2011, by the European Patent Office as the International Searching Authority for International Application No. PCT/EP2011/005564.

* cited by examiner

DEVICE FOR CONNECTING A CIRCUIT BREAKER

RELATED APPLICATION(S)

This application claims priority as a continuation application under 35 U.S.C. §120 to PCT/EP2011/005564, which was filed as an International Application on Nov. 4, 2011 designating the U.S., and which claims priority to German Application 102010050654.0 filed in Germany on Nov. 9, 2010. The entire contents of these applications are hereby incorporated by reference in their entireties.

FIELD

The disclosure relates to an arrangement for connecting a circuit breaker in a switchpanel, for example, in a switching device combination, having conductors, which are in the form of busbars and are supported against one another, for receiving forces which result from normal operating behavior and from short-circuit situations.

BACKGROUND INFORMATION

Circuit breakers can be incorporated in switchpanels in a switching device combination and can be connected to busbars by rails or cables. For example, these rails, and cables, can be supported mechanically against one another in order to receive operating and short-circuit forces.

Known electrical conductors, for example, solid rails, flexible rails or cables, can be electrically insulated with a shrink sleeve or with an adhesive strip.

However, the use of shrink sleeves or even an insulating strip in known electrical connections in a switching device combination can be disadvantageous because they, as virtually floating connections, place high demands on the respective fasteners in order to achieve sufficient stationary stability of the conductor arrangement.

Exemplary embodiments of the disclosure specify an arrangement for connecting a circuit breaker in a switchpanel which is improved in respect of the stationary stability of the conductor guide in a simple manner and with little expenditure.

SUMMARY

An arrangement is disclosed for connecting a circuit breaker in a switchpanel, having conductors, which are busbars supported against one another, for receiving forces which result from normal operating behavior and from short-circuit situations, comprising: at least two-piece encapsulations for surrounding each conductor over its entire circumference, the encapsulation electrically insulating the conductor.

BRIEF DESCRIPTION OF THE DRAWINGS

The disclosure, particular advantageous refinements of and improvements and particular advantages of the disclosure will be explained in greater detail and described with reference to an exemplary embodiments which are shown schematically in the appended drawings, in which.

DETAILED DESCRIPTION

Figure 1:
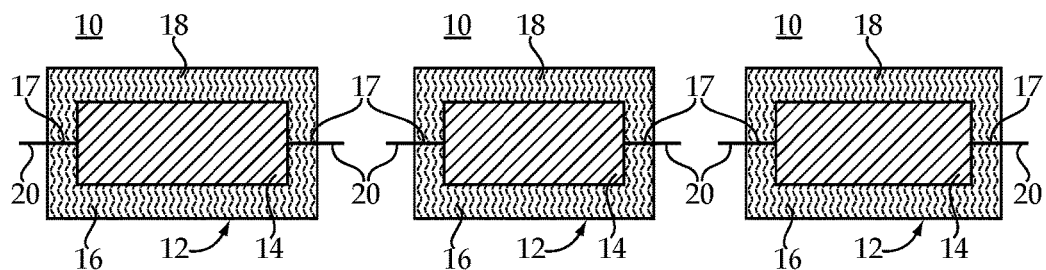
FIG. 1 shows a cross-sectional view of an arrangement of an exemplary embodiment of the disclosure of three individual conductors, in each case in an individual encapsulation.

In an exemplary embodiment of the disclosure, conductors are arranged in at least two-piece encapsulations which can surround the conductor in question in each case over its entire circumference and serve as electrical insulation.

In this case, provision can be made for the conductor insulation which is formed from at least two encapsulations to be provided with or connected to holding devices which can ensure that forces of the rail conductors, which result from normal operating behavior and from short-circuit situations, can be reliably removed.

According to an exemplary embodiment of the present disclosure, the rails are arranged, supported and insulated with the aid of encapsulations which can be in the form of plastic tubs. In this case, a lower and an upper half are provided for all external conductors or each external conductor or a right-hand or left-hand half of each external conductor.

The tub-like encapsulations can completely surround the rails and therefore insulate the rails and also support and arrange the rails.

This can create new possibilities, primarily in respect of safety during servicing, for example connection of external cables and in the region of fault arc safety, on account of this technology.

The system according to an exemplary embodiment of the disclosure can be a modular design and in this way can provide simple and reliable connection to the busbars but also connection to external cables or busbar systems.

In respect of the required current-carrying capacity, the system also can provide the option of being able to adapt to the respective requirement at any time by virtue of the modular insulating tubs and the busbars arranged therein by stacking the modules at relatively high currents.

According to an exemplary embodiment of the disclosure, the at least two-piece encapsulation can be formed from a material which is based on plastic, wherein the encapsulation is provided, in particular, with tightly closed joints, with the result that, for example, accidental ingress of moisture into the interior of the encapsulation can be prevented.

The arrangement according to an exemplary embodiment of the disclosure can be arranged so that each at least two-piece encapsulation accommodates only a single conductor. This can result in a plurality of conductors being arranged separately in respectively individually associated encapsulations.

In this case, it can be desirable, according to an exemplary embodiment of the disclosure, for a plurality of conductors to be arranged in a space-saving manner in adjacent encapsulations which closely adjoin one another. In addition to the mentioned space-saving effect, this can also have the advantage that the individual encapsulations are supported against one another and mechanical fastening in the switching device arrangement in question is made easier.

According to an exemplary embodiment of the disclosure, conductors which are associated with different phases can also be arranged in adjacent encapsulations which adjoin one another.

Provision can further be made for a plurality of conductors which are associated with the same phase to be arranged in encapsulations which are situated one above the other, that is to say stacked encapsulations, whereas a plurality of conductors which are associated with different phases are arranged in encapsulations which are situated next to one another.

In line with an exemplary embodiment of the disclosure, each encapsulation can be produced as a shaped injection-molded part. As an alternative, these shaped parts can also be reinforced with fibers. It is also possible to produce the encapsulation from plastic plates which are provided with edges.

FIG. 1 shows a cross-sectional view of three arrangements 10 with three individual conductors 14 which are arranged in an individual encapsulation 12 in each case, the encapsulation 12 being formed from a lower shell 16 and an upper shell 18. The encapsulation 12 has a respective joint 17 which is fluid-tight, with the result that no fluid, in particular no liquid, can enter the interior of the encapsulation.

A mounting aid 20 is integrally formed or arranged on both outer sides of the encapsulation 12, the conductor 14 in question for receiving forces which result from normal operating behavior and short-circuit situations being fastened by the mounting aid.

Figure 2:
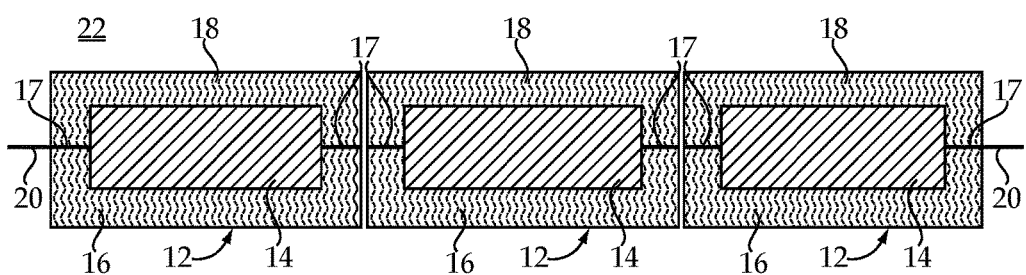
FIG. 2 shows a cross-sectional view of an arrangement of an exemplary embodiment of the disclosure of conductors of three-phase design, in each case in an individual encapsulation.

FIG. 2 shows a cross-sectional view of an arrangement 22 of conductors 14 which are of three-phase design and are each arranged in individual encapsulations 12, the arrangement being of substantially identical design to the arrangement 10 shown in FIG. 1.

However, in contrast to the above, the conductors 14 which are associated with a three-phase system are each arranged separately in encapsulations 12 which are arranged close to one another, between which no mounting aid 20 is provided and which therefore form an arrangement 22 which is formed from an integral block virtually without any distance between one another.

Each conductor 14 carries the current of the phase which is associated with the conductor 14, wherein the encapsulation serves as an electrical insulator, as also in the arrangement 10 according to FIG. 1.

Figure 3:
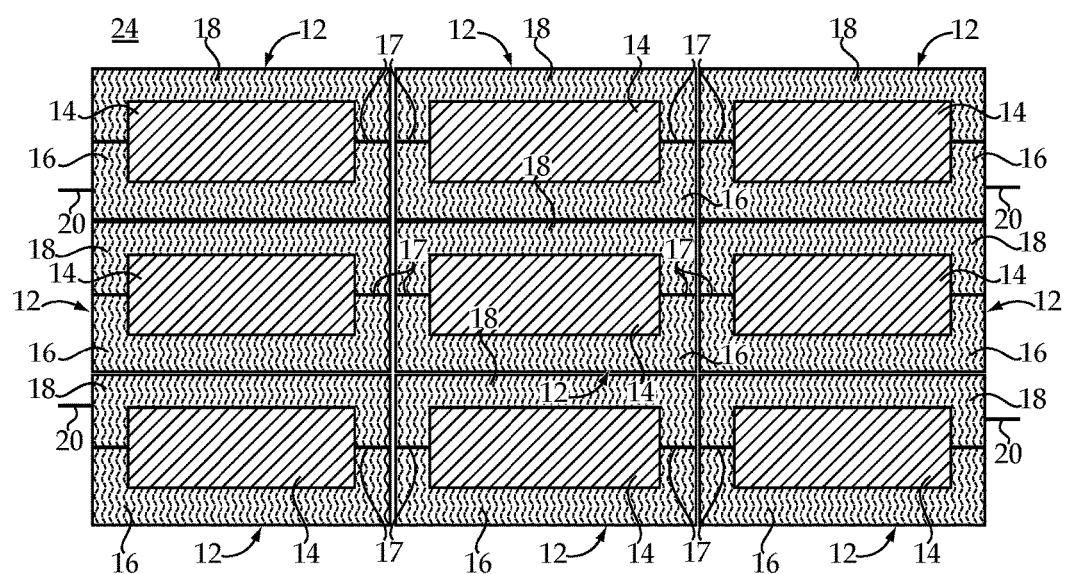
FIG. 3 shows a cross-sectional view of an arrangement of an exemplary embodiment of the disclosure of triple conductors of three-phase design, in each case in an individual encapsulation.

FIG. 3 shows a cross-sectional view of a three-phase arrangement 24, in which a plurality of conductors 14 are provided for each phase, the conductors each being stacked one on the other with the phases being associated.

In other words, FIG. 3 shows the arrangement 22 shown in FIG. 2 in triplicate since each phase is likewise provided with three individual conductors 14 which are arranged in encapsulations 12 which are situated closely one above the other.

The modular design of the insulation which is designed as an encapsulation 12 firstly allows the insulation to be produced in a simple manner and secondly allows it to be accommodated in a space-saving manner in the respective switchpanel or in the respective switching device arrangement or combination, these not being shown here in any detail.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

LIST OF REFERENCE SYMBOLS

10 Individual conductor in an individual encapsulation
12 Encapsulation of a conductor
14 Individual conductor
16 Lower tub
17 Joint
18 Upper tub
20 Mounting aid
22 Three-phase conductor in an individual encapsulation
24 Three-phrase triple conductor in an individual encapsulation

What is claimed is:

1. An arrangement for connecting a circuit breaker in a switchpanel, having conductors, which are busbars supported against one another, for receiving forces which result from normal operating behavior and from short-circuit situations, comprising:
   at least two-piece encapsulations for surrounding each conductor over its entire circumference, the encapsulation electrically insulating the conductor,
   wherein a plurality of conductors are arranged separately in respectively individually associated at least two-piece encapsulations, and
   wherein a plurality of conductors are arranged in adjacent encapsulations which adjoin one another.

2. The arrangement as claimed in claim 1, wherein the at least two-piece encapsulation is formed from a material which is based on plastic.

3. The arrangement as claimed in claim 2, wherein the at least two-piece encapsulation comprises tightly closed joints.

4. The arrangement as claimed in claim 1, wherein the at least two-piece encapsulation comprises tightly closed joints.

5. The arrangement as claimed in claim 1, wherein conductors associated with different phases are arranged in adjacent encapsulations which adjoin one another.

6. The arrangement as claimed in claim 5, wherein a plurality of conductors associated with the same phase are arranged in encapsulations which are situated one above the other.

7. The arrangement as claimed in claim 1, wherein a plurality of conductors are associated with different phases are arranged in encapsulations which are situated next to one another.

8. The arrangement as claimed in claim 1, wherein each encapsulation is produced as a shaped injection-molded part.

9. The arrangement as claimed in claim 1, in combination with a switching device.

10. The arrangement as claimed in claim 1, wherein the at least two-piece encapsulations are formed of a lower shell and an upper shell that are separate pieces.

11. The arrangement as claimed in claim 10, wherein the upper shell and the lower shell are in contact with each other at two joints, and a mounting aid is located at each of the two joints.

* * * * *